(12) United States Patent
Bloeckner et al.

(10) Patent No.: US 10,884,415 B2
(45) Date of Patent: Jan. 5, 2021

(54) UNMANNED AERIAL VEHICLE LIGHT FLASH SYNCHRONIZATION

(71) Applicant: Intel Corporation, Santa Clara, CA (US)

(72) Inventors: Anna Magdalena Bloeckner, Krailling (DE); Daniel Pohl, Puchheim (DE); Markus Achtelik, Woerthsee (DE)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 16/234,599

(22) Filed: Dec. 28, 2018

(65) Prior Publication Data

US 2019/0138011 A1     May 9, 2019

(51) Int. Cl.
| | |
|---|---|
| *B64C 39/02* | (2006.01) |
| *B64D 47/04* | (2006.01) |
| *B64D 47/08* | (2006.01) |
| *G03B 15/00* | (2006.01) |
| *G03B 15/03* | (2006.01) |

(Continued)

(52) U.S. Cl.
CPC ......... *G05D 1/0094* (2013.01); *B64C 39/024* (2013.01); *B64D 47/04* (2013.01); *B64D 47/08* (2013.01); *H04N 5/067* (2013.01); *H04N 5/2354* (2013.01); *B64C 2201/123* (2013.01); *B64C 2201/127* (2013.01); *B64C 2201/141* (2013.01); *B64C 2201/143* (2013.01)

(58) Field of Classification Search
CPC .. B64D 47/08; B64D 47/04; B64C 2201/141; B64C 2201/143; B64C 2201/123; B64C 2201/127; B64C 39/024; G03B 2206/00; G03B 15/006; G03B 15/03; G05D 1/0094; G05D 1/104; H04N 5/2354; H04N 5/067

USPC ............................................................ 701/3
See application file for complete search history.

(56) References Cited

U.S. PATENT DOCUMENTS

2017/0243355 A1*   8/2017   Lin ..................... H04N 7/188
2017/0313416 A1*  11/2017   Mishra .................. G05D 1/104
(Continued)

FOREIGN PATENT DOCUMENTS

| KR | 20170067373 A | 6/2017 |
|---|---|---|
| WO | 2015095244 A1 | 6/2015 |
| WO | 2017170148 A1 | 2/2019 |

OTHER PUBLICATIONS

International Search Report issued for the corresponding PCT application PCT/US2019/060669, dated May 8, 2020, 12 pages (for informational purpose only).

*Primary Examiner* — Behrang Badii
*Assistant Examiner* — Hossam M Abd El Latif
(74) *Attorney, Agent, or Firm* — Viering, Jentschura & Partner mbB

(57) ABSTRACT

Herein is disclosed an unmanned aerial vehicle light flash comprising a support structure; a camera coupled to the support structure and configured to take a photograph; one or more processors coupled to the support structure and configured to control a predetermined flight plan of the unmanned aerial vehicle, control the camera, generate or process a synchronization signal to synchronize a light flash to be generated by a further unmanned aerial vehicle with a taking of the photograph by the camera; a transceiver coupled to the support structure and configured to transmit or receive the synchronization signal to or from the further unmanned aerial vehicle.

17 Claims, 7 Drawing Sheets

(51) Int. Cl.
*G05D 1/00* (2006.01)
*G05D 1/10* (2006.01)
*H04N 5/067* (2006.01)
*H04N 5/235* (2006.01)

(56) References Cited

U.S. PATENT DOCUMENTS

| | | | |
|---|---|---|---|
| 2018/0259616 A1* | 9/2018 | Jo | G01S 17/36 |
| 2019/0009916 A1* | 1/2019 | Von Novak | H04B 10/807 |
| 2019/0176967 A1* | 6/2019 | Ohata | B64C 13/20 |
| 2020/0031468 A1* | 1/2020 | Neubecker | B64C 39/024 |

* cited by examiner

UNMANNED AERIAL VEHICLE LIGHT FLASH SYNCHRONIZATION

TECHNICAL FIELD

Various embodiments relate generally to using unmanned aerial vehicles ("UAV") to photograph objects of interest using cameras and light flashes.

BACKGROUND

A conventional unmanned aerial vehicles ("UAV") may carry a camera to take a photograph of an object. Professional UAVs are used to facilitate in manual tasks to save time and money. For example, UAV can be used to inspect planes, oil refineries, power plants, and mills. Additionally, they can be used to take aerial photographs from different angles to create 3D models of objects of interest. Photographs taken by UAV are often limited to daylight hours because photographs taken at lower lighting conditions are prone to significant noise.

Previously, UAV were affixed with a static lamp to assist in night time flying and photographing objects. However, the static lamp could not be independently positioned to illuminate the surface of the object to be photographed. The fixed position of the static lamp may create undesired shadows on the object to be photographed. Even if the static lamp did not create undesired shadows, having the static lamp affixed to the UAV is not ideal for inspection tasks since inspection tasks may require specific lighting conditions at a configurable angle to create desired shadows and enhance structural details, such as cracks.

SUMMARY

An unmanned aerial vehicle is provided. The unmanned aerial vehicles includes a support structure, a camera coupled to the support structure and configured to take a photograph, one or more processors coupled to the support structure and configured to control a predetermined flight plan of the unmanned aerial vehicle, control the camera, generate or process a synchronization signal to synchronize a light flash to be generated by a further unmanned aerial vehicle with a taking of the photograph by the camera, and a transceiver coupled to the support structure and configured to transmit or receive the synchronization signal to or from the further unmanned aerial vehicle.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
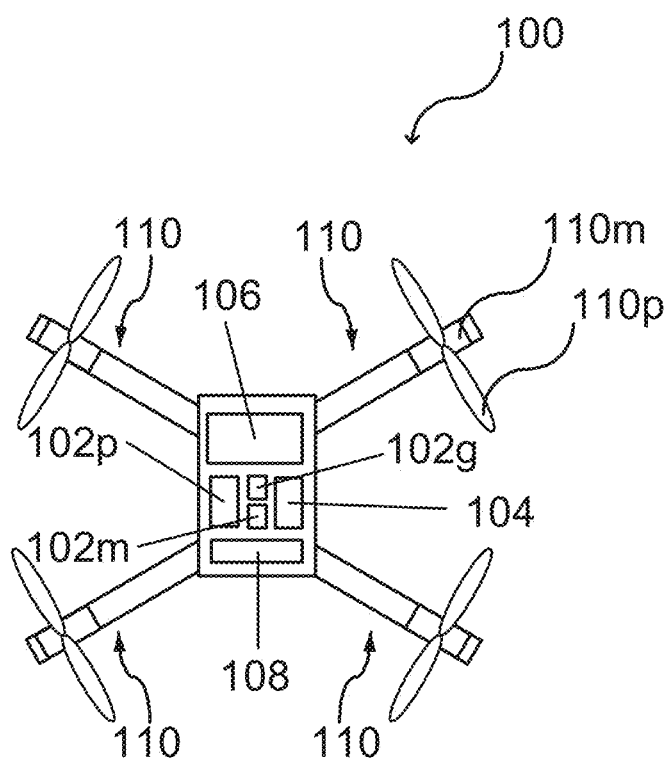
FIG. 1 shows an unmanned aerial vehicle configuration according to an aspect of the disclosure.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as unstaffed, uninhabited or unpiloted aerial vehicle, -aircraft or -aircraft system or UAV.

FIG. 1 illustrates an unmanned aerial vehicle 100 in a schematic view, according to various aspects. The unmanned aerial vehicle 100 may include a support structure 140, such as a frame and/or a housing. The support structure 140 may include any part of the unmanned aerial vehicle 100 to which other objects can be attached. The unmanned aerial vehicle 100 may include a plurality of (e.g., three or more than three, e.g., four, six, eight, etc.) vehicle drive arrangements 110. Each of the vehicle drive arrangements 110 may include at least one drive motor $110m$ and at least one propeller $110p$ coupled to the at least one drive motor $110m$. The one or more drive motors $110m$ of the unmanned aerial vehicle 100 may be electric drive motors.

Further, the unmanned aerial vehicle 100 may include one or more processors $102p$ configured to control flight or any other operation of the unmanned aerial vehicle 100 including but not limited to navigation, image analysis, location calculation, and any method or action described herein. One or more of the processors $102p$ may be part of a flight controller or may implement a flight controller. The one or more processors $102p$ may be configured, for example, to provide a flight path based at least on an actual position of the unmanned aerial vehicle 100 and a desired target position for the unmanned aerial vehicle 100. In some aspects, the one or more processors $102p$ may control the unmanned aerial vehicle 100. In some aspects, the one or more processors $102p$ may directly control the drive motors $110m$ of the unmanned aerial vehicle 100, so that in this case no additional motor controller may be used. Alternatively, the one or more processors $102p$ may control the drive motors $110m$ of the unmanned aerial vehicle 100 via one or more additional motor controllers. The one or more processors $102p$ may include or may implement any type of controller suitable for controlling the desired functions of the unmanned aerial vehicle 100. The one or more processors $102p$ may be implemented by any kind of one or more logic circuits.

According to various aspects, the unmanned aerial vehicle 100 may include one or more memories $102m$. The one or more memories may be implemented by any kind of one or more electronic storing entities, e.g. a one or more volatile memories and/or one or more non-volatile memories. The one or more memories 102*m* may be used, e.g., in interaction with the one or more processors 102*p*, to build and/or store image data, ideal locations, locational calculations, or alignment instructions.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include one or more depth sensors 106. The one or more depth sensors 106 may be configured to monitor a surrounding environment of the unmanned aerial vehicle 100, including that of a satellite unmanned aerial vehicle. The one or more depth sensors 106 may be configured to detect obstacles in the surrounding environment. The one or more depth sensors 106 may include, for example, one or more cameras (e.g., a depth camera, a stereo camera, a thermal imaging camera, etc.), one or more ultrasonic sensors, etc. The unmanned aerial vehicle 100 may further include a position detection system 102*g*. The position detection system 102*g* may be based, for example, on Global Positioning System (GPS) or any other available positioning system. Therefore, the one or more processors 102*p* may be further configured to modify the flight path of the unmanned aerial vehicle 100 based on data obtained from the position detection system 102*g*. The depth sensors 106 may be mounted as depicted herein, or in any other configuration suitable for an implementation.

According to various aspects, the one or more processors 102*p* may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 102*p* may further include an inertial measurement circuit (IMU) and/or a compass circuit. The inertial measurement circuit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, the one or more processors 102*p* may be configured to determine an orientation of the unmanned aerial vehicle 100 in a coordinate system. The orientation of the unmanned aerial vehicle 100 may be calibrated using the inertial measurement circuit before the unmanned aerial vehicle 100 is operated in flight modus. However, any other suitable function for navigation of the unmanned aerial vehicle 100, e.g., for determining a position, a flight velocity, a flight direction, etc., may be implemented in the one or more processors 102*p* and/or in additional components coupled to the one or more processors 102*p*. The unmanned aerial vehicle 100 further includes camera 108 configured to photograph an object of interest. The camera 108 may be a still photo camera 108, e.g. a depth camera (e.g. Intel® RealSense™ depth camera). However, any other suitable or desired camera may be used in alternative configurations.

Figure 2:
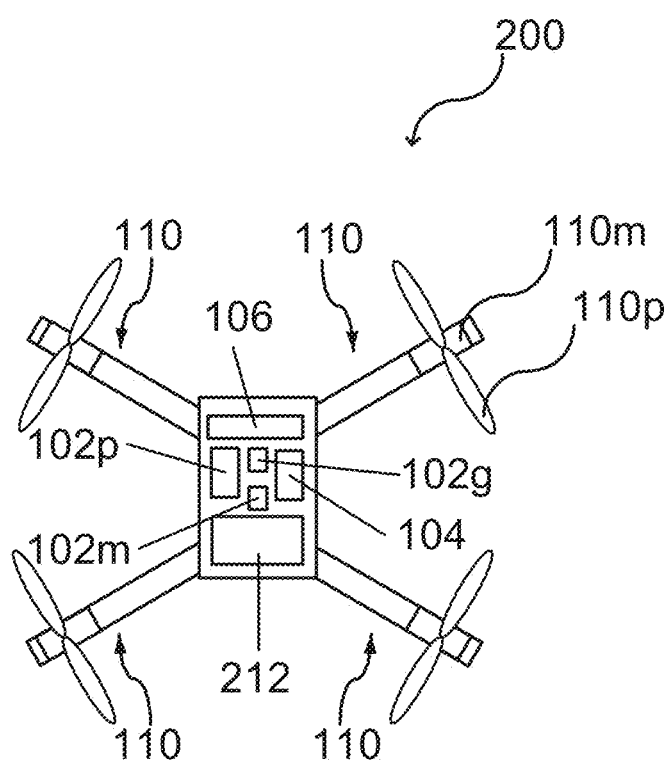
FIG. 2 shows another unmanned aerial vehicle configuration according to an aspect of the disclosure.

FIG. 2 illustrates another unmanned aerial vehicle 200 in a schematic view, according to various aspects. The unmanned aerial vehicle 200 includes one or more light flashes 212. The unmanned aerial vehicle 200 may also include one or more depth sensors 106. The one or more depth sensors 106 may be configured to monitor a surrounding environment of the unmanned aerial vehicle 100, including that of a satellite unmanned aerial vehicle. The one or more depth sensors 106 may be configured to detect obstacles in the surrounding environment. The one or more depth sensors 106 may include, for example, one or more cameras (e.g., a depth camera, a stereo camera, a thermal imaging camera, etc.), one or more ultrasonic sensors, etc.

Figure 3:
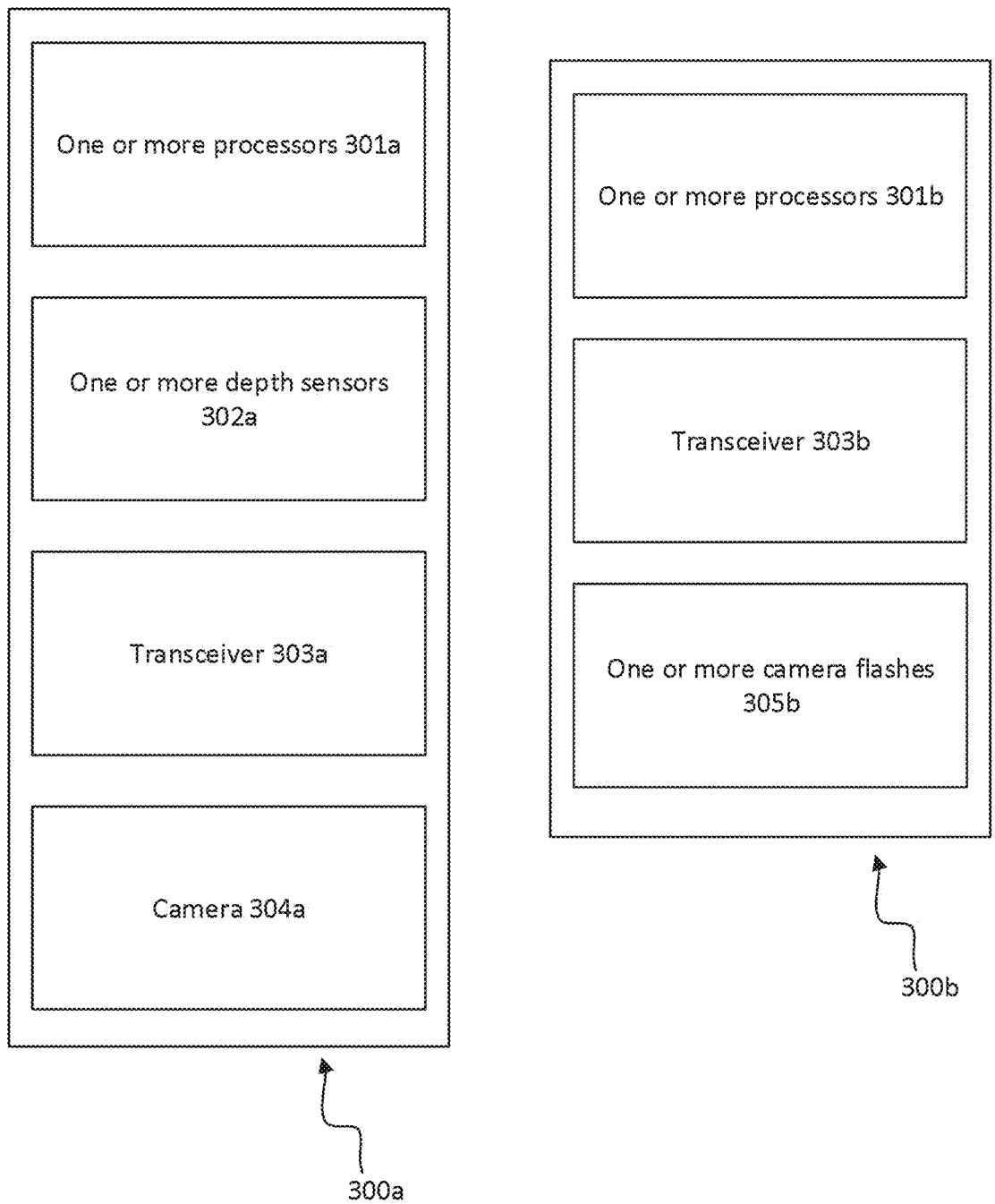
FIG. 3 shows an unmanned aerial vehicle photography system.

FIG. 3 illustrates an unmanned aerial vehicle photography system including an unmanned aerial vehicle 300*a* and a further unmanned aerial vehicle 300*b*, wherein the unmanned aerial vehicle 300*a* further includes one or more processors 301*a*, configured to control an aerial movement of the unmanned aerial vehicle 300*a*, control a camera, and generate or process a synchronization signal; one or more depth sensors 302*a*, configured capture the surrounding environment; one or more transceivers 303*a*, configured to transmit or receive a synchronization signal; and a camera 304*a*, configured to take a photograph; and wherein unmanned aerial vehicle 300*b* further includes one or more processors 301*b*, configured to control an aerial movement of the unmanned aerial vehicle 300*b*, control a flash device, and generate or process a synchronization signal; one or more transceivers 303*b*, configured to transmit or receive a synchronization signal; and one or more light flashes 305*b* configured to flash based on the synchronization signal.

The unmanned aerial vehicles 300*a* may also include one or more processors 301*a* configured to generate or process and adjustment signal and transceiver 303*a* to transmit or receive the adjustment signal and cause to the unmanned aerial vehicle 300*a* to adjust its position based on the adjustment signal.

The unmanned aerial vehicles 300*b* may also include one or more processors 301*b* configured to generate or process and adjustment signal and transceiver 303*b* to transmit or receive the adjustment signal and cause to the unmanned aerial vehicle 300*b* to adjust its position based on the adjustment signal.

Figure 4:
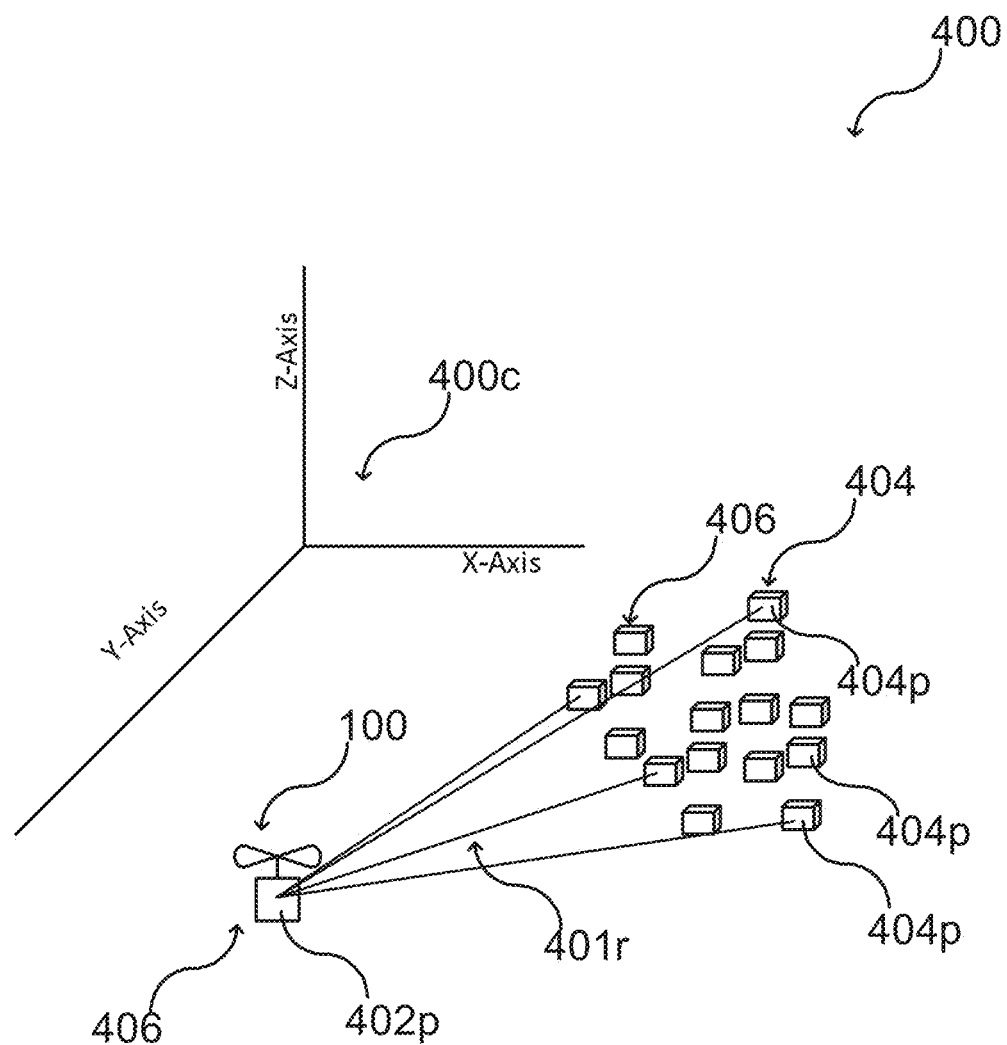
FIG. 4 shows an exemplary use of a map generated based on obstacle information, according to some aspects.

FIG. 4 illustrates a schematic view of a map 400 that is used to control flight of an unmanned aerial vehicle 100, according to various aspects. The unmanned aerial vehicle 100 may be represented in the map 400. As an example, a current position 402*p* of the unmanned aerial vehicle 100 may be tracked via the map 400 dynamically. Further, one or more objects 404 may be represented in the map 400. As an example, a position 404*p* of the one or more objects 404 may be determined by the unmanned aerial vehicle 100 and stored in a voxel map. The map 400 may be updated dynamically with respect to the one or more objects 404 upon receiving new information associated with the position 404*p* of the one or more objects 404.

According to various aspects, the map 400 may be a three-dimensional map representing the vicinity (or at least a part of the vicinity) of the unmanned aerial vehicle 100. The map 400 may include a coordinate system 400*c*. The coordinate system 400*c* may be, for example, a Cartesian coordinate system including three orthogonal axes (e.g., referred to as X-axis, Y-axis, and Z-axis). However, any other suitable coordinate system 400*c* may be used.

According to various aspects, the map 400 may be used to represent positions 404*p* of one or more objects 404 relative to a position 402*p* of the unmanned aerial vehicle 100. According to various aspects, a computer engine (e.g., a 3D-computer engine) may be used to generate the map 400 and to represent the unmanned aerial vehicle 100 and the one or more objects 404 in the map 400. For visualization, a graphic engine may be used. According to various aspects, dynamics may be included in the map 400, e.g., movement of the one or more objects 404, appearance and disappearance of the one or more objects 404, etc.

According to various aspects, the information on how to build that map 400 may be received from one or more sensors configured to detect any type of objects 404 in a vicinity of the unmanned aerial vehicle 100. As an example, one or more cameras, e.g., one or more RGB cameras, one or more depth cameras, etc., may be used to obtain image data from the vicinity of the unmanned aerial vehicle 100. Based on the obtain image data, the map 400 may be built accordingly. According to various aspects, the map 400 may be built during flight of the unmanned aerial vehicle 100 (e.g., on the fly starting with an empty map 400) using one or more sensors of the unmanned aerial vehicle 100. The information received by the one or more sensors may be stored in one or more memories 102m included in the unmanned aerial vehicle 100. Alternatively or additionally, the map 400 may include one or more predefined objects 404, etc. The predefined objects 404 may be known from a previous flight of the unmanned aerial vehicle 100 or from other information that may be used to build the map 400. According to various aspects, the map 400 of the unmanned aerial vehicle 100 may be correlated with a global map, e.g., via global positioning system (GPS) information, if desired.

According to various aspects, the map 400 may be a voxel map. In this case, the one or more objects 404 and their positions may be represented by one or more voxels in the voxel map. A voxel may include graphic information that defines a three-dimensional volume. Unlike a pixel, which defines a two dimensional space based, for example, on an x-axis and a y-axis, a voxel may have the addition of a z-axis. According to various aspects, the voxels in the voxel map may be configured to carry additional information, such as thermal information, as described in more detail below. According to various aspects, the one or more voxels may be determined from a three-dimensional camera (depth camera) or a combination of image sensors or cameras providing image overlap (e.g., using a 3D-camera). The obtained image data may be processed by a voxel engine to transform the image data into voxels. The voxel engine may be implemented by a computing entity, e.g., including one or more processors, one or more a non-transitory computer readable media, etc. The translation of image data into voxels may be carried out using rasterization, volume ray casting, splattering, or any other volume rendering method. Once translated, the voxels may be stored in the voxel map. Once stored in the voxel map, the flight of the unmanned aerial vehicle 100 may be controlled based on the voxels stored on the voxel map.

According to various aspects, the map 400 may be a dynamic map, e.g., the map 400 may be updated (also referred to as built and/or rebuilt) in a pre-defined time interval, for example, new objects may be added, object may be deleted, position changes of the objects may be monitored, etc. According to various aspects, the map 400 may be updated based on sensor data (e.g., obtained by one or more sensors of the unmanned aerial vehicle 100). Alternatively, the map 400 may be updated based on data transmitted to the unmanned aerial vehicle 100, e.g., via a wireless communication. In the map 400, the position 400p of the unmanned aerial vehicle 100 relative to the position 404p of the one or more objects 404 may change during flight of the unmanned aerial vehicle 100. A reference for a movement of the unmanned aerial vehicle 100 and/or of the one or more objects 404 may be a fixed ground, e.g., defined by GPS information or other suitable information.

According to various aspects, the unmanned aerial vehicle 100 may be configured to check (e.g., during flight) for a collision with one or more objects 404 near the unmanned aerial vehicle 100 based on the map 400. In the case that a voxel map is used, the unmanned aerial vehicle 100 may check for a collision with the one or more objects 404 by ray tracing within the voxel map. However, other implementations of a collision detection may be used.

As illustrated in FIG. 4, in the map 400, the unmanned aerial vehicle 100 may trace rays 401r against the map (e.g., in any direction, in flight direction, within a sector along the flight direction, etc.) to determine how far objects 404 are away from the unmanned aerial vehicle 100. Further, the direction of the one or more objects 404 relative to the unmanned aerial vehicle 100 may be determined. According to various aspects, a collision avoidance operation may be carried out based on the relative position of the one or more objects 404 with respect to the actual position of the unmanned aerial vehicle 100. Illustratively upon preestimating a collision with one or more objects, these one or more objects may be regarded as obstacles, since a collision with a solid object in general may have a high likelihood of harming the unmanned aerial vehicle 100. As an example, the collision avoidance operations may include stopping at a pre-defined safety distance from the detected obstacle, circumflying the detected obstacle with a pre-defined safety distance, increasing distance from the detected obstacle, and/or returning to a pre-defined safety position (e.g., a starting position or return to home position).

According to various aspects, the collision avoidance operation may be modified or extended based on the movement data to avoid an impact of a moving obstacle into the unmanned aerial vehicle 100.

According to various aspects, the map 400 may be a 3D computer graphics environment and ray tracing may be used for collision prediction and avoidance and/or for impact prediction and avoidance.

Figure 5:
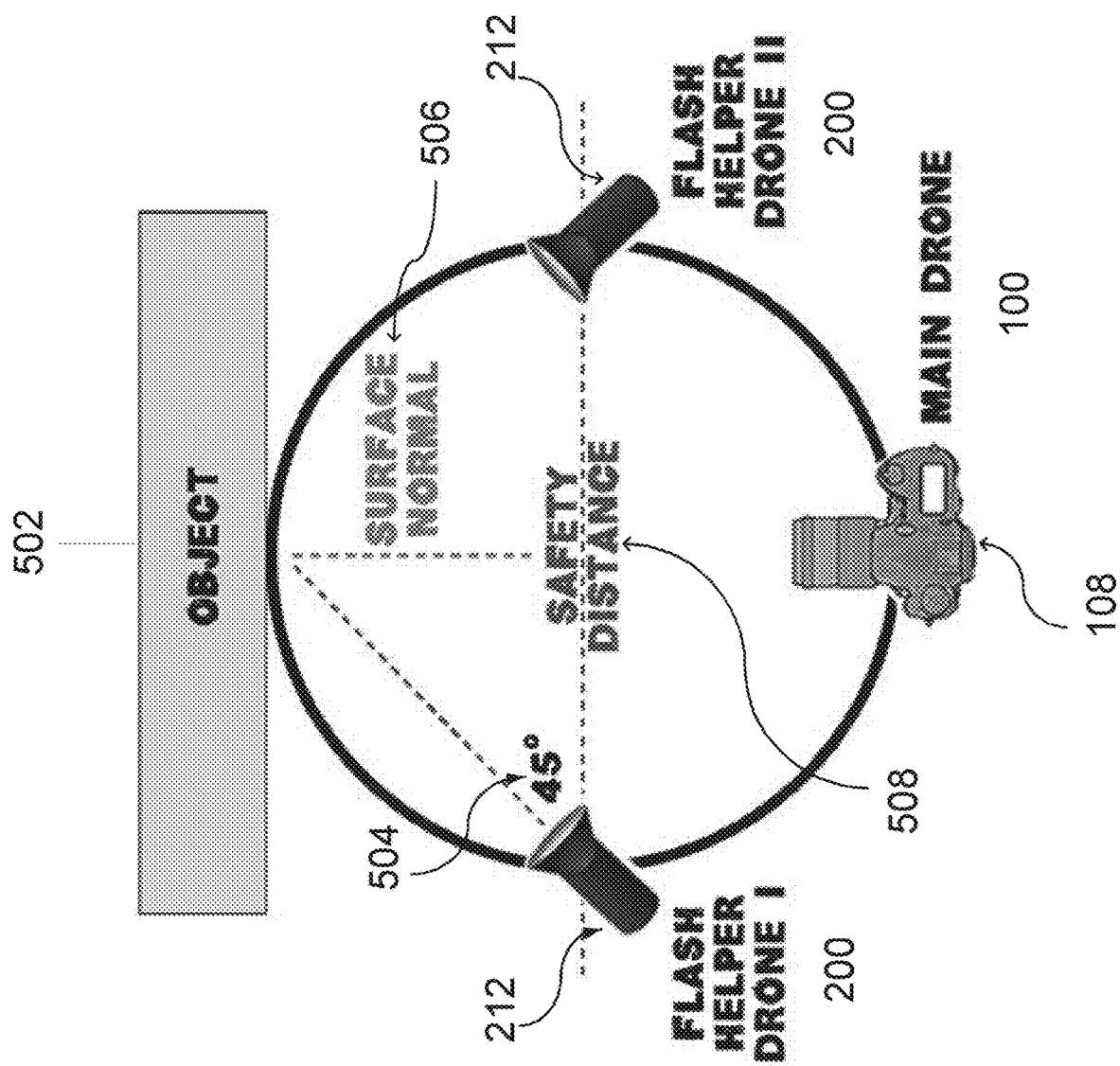
FIG. 5 shows an example setup of an unmanned aerial vehicle photography system based voxel map of the environment of the unmanned aerial vehicle photography system.

FIG. 5 illustrates an example positioning of the unmanned aerial vehicle system. The positioning may be based on map 400 generated by depth sensors 106 attached to unmanned aerial vehicle 100. Map 400 may be a voxel map internally created from depth images captured of the surrounding environment of the unmanned aerial vehicle photography system positioned to photograph object 502. The surface of object 502 is detected by depth sensors 106 to determine a surface normal 506 based on the surface of object of interest 502. The surface normal is the angle from which camera 108 takes the photograph of object 502. For example, camera 108 may be position so that it is pointed 90 degrees or perpendicular to a point of object 502. The surface normal 506 depends on the surface detected by depth sensors 106. Unmanned aerial vehicle 100 and unmanned aerial vehicles 200 will be positioned based on the surface normal 506. For example, the unmanned aerial vehicles 200 are aligned at 45 degree angle 504 to light up the surface of object 502. Additionally positions of the unmanned aerial vehicles 200 are determined by safety distance 508. Safety distance 508 are determined by the field of view of the camera 108. The unmanned aerial vehicles 200 are positioned based on safety distance 508 to ensure they are not in the field of view of camera 108. If the camera's 108 zoom is adjusted, unmanned aerial vehicle 100 can transmit an adjustment signal to ensure that the UAV 200 are not in the camera's 108 field of vision. The UAV 200 are positioned in the direction of the photographed object 502 based on knowing its surface normal 506. In the example shown, the UAV 200 are aligned at a 45 degree angle 504.

Figure 6:
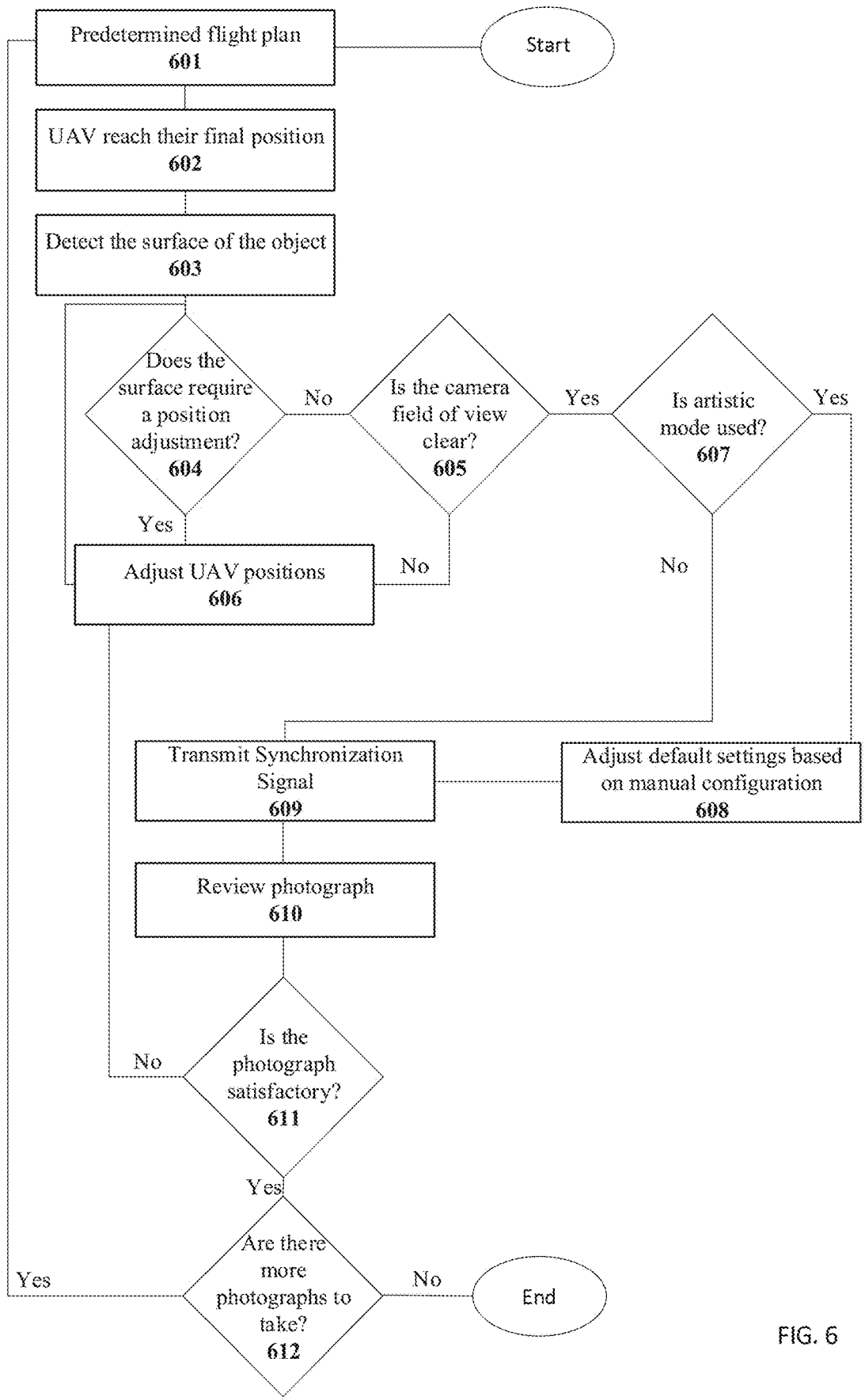
FIG. 6 shows a method of an unmanned aerial vehicle photography system.

FIG. 6 illustrates a method (the method may be performed by the one or more processors 102p) of unmanned aerial photography including controlling an aerial movement of the plurality of unmanned aerial vehicles 601; determining that the plurality of unmanned aerial vehicles have reached their final position 602; detecting the surface of the object to be photographed 603; determining if an unmanned aerial vehicle has to be repositioned 604; executing the command to reposition the unmanned aerial vehicle(s) 606; determining if the field of view of the camera is clear 605; determining if artistic mode is being used 607; adjusting default settings based a manual configuration 608; transmitting a synchronization signal 609; reviewing the photograph 610; determining if the photograph is satisfactory 611; and determining if there are more photographs to take 612.

Figure 7:
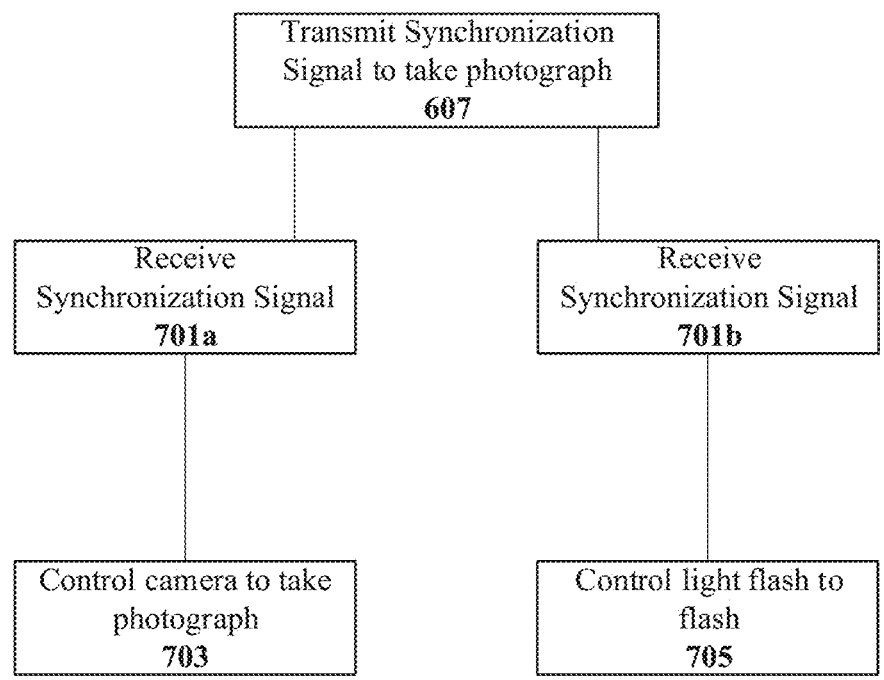
FIG. 7 shows a method of light flash synchronization.

FIG. 7 illustrates a method (the method may be performed by the one or more processors 102p) of synchronizing separate devices. In response to the transmittal of a synchronization signal 609; receiving the synchronization signal 701a and a 701b; in response to receiving the synchronization signal, causing a camera to take a photograph based on the synchronization signal 703; and in response to receiving the synchronization signal, causing a light flash to flash based on the synchronization signal 705. In one embodiment, taking the photograph and the flash occur concurrently. In another embodiment, taking the photograph occurs after the flash. In yet another embodiment, taking the photograph occurs before the flash.

The unmanned aerial vehicle includes transceivers configured to transmit and receive a synchronization signal. One or more processors configured to generate and process the synchronization signal, control the transceiver to transmit and receive the synchronization signal, control a predetermined flight plan, and control a camera or light flash.

In one example, the system may include an unmanned aerial vehicle equipped with a camera to take photographs. Further unmanned aerial vehicles are equipped with a light flash to illuminate the object being photographed by the unmanned aerial vehicle equipped with a camera. Both types of UAV are equipped one or more processors, which are configured to control the aerial movement of the UAV. These processors may control the UAV with respect to ignition, takeoff, flight, location or location within the environment of the system of unmanned aerial vehicles, position or position within a system of unmanned aerial vehicles, and landing, according to a predetermined flight plan. The UAV can be configured to autonomously travel according to a predetermined flight plan toward an object to be photographed which is the point of interest. The predetermined flight plan may include autonomous adjustments of the UAV upon reaching the position to take a photograph, generating and processing a synchronization signal, and transmitting and receiving the synchronization signal through transceivers to take the photograph and flash.

Considerations for designing a distributed UAV solution for photography may be to extend battery life as long as possible. By using UAV to carry the heavy light flash, we can extend the battery life of the UAV including a camera. This lowers the weight of the UAV including a camera and increases its flight time. Further, having the light flash on further UAV enables free positioning and orientation to get desired illumination effects. The system supports multiple UAV that include a light flash. Multiple UAV including a light flash might be a requirement for fulfilling a UAV inspection task.

The system makes it possible to have professional tasks done at all times of the day and in areas with poor light. The system can be run autonomously to complete inspection tasks. For example, inspecting a windmill outside of daylight hours. Another example is the inspection of the interior of buildings. In such a case there is often not enough light present to capture high quality images. For example, in scenarios like inspecting the ruins of Fukushima, it would be critical to have enough light brought in by a UAV including a light flash to take photographs of the Fukushima nuclear power plant. Other examples for the use of the system include search and rescue at night, finding escaped prisoners at night, inspecting damages from earthquakes at night, inspecting mining tunnels, inspecting caves, inspecting underneath bridges. The system makes it possible to take high quality photographs in low natural light conditions. Without UAV equipped with light flashes, the camera ISO setting has to be set with high values leading to noise in the resulting photograph, or a longer exposure time is required which leads to a blurred photograph.

The depth sensors of the system can be used to avoid obstacles along the predetermined flight plan. For example the Intel® Falcon™ 8+ uses collision detection/obstacle avoidance enabled through Intel® RealSense™. The captured depth images are converted into voxels which are entered into a map of the environment. If it is dark, there are no valid results from the depth sensors in outdoor use. To keep obstacle avoidance running at night, it would be required to have enough light on the surrounding environment. The UAV equipped with light flashes can assist the UAV equipped with a camera with their light to allow the depth sensors to capture relevant surrounding environment data at night. While the flash would only illuminate the environment at certain instances of time, slower flying at night would still be possible. Obstructions to the predetermined flight plan can be detected even at night with the use of the light flashes of the unmanned aerial vehicles. By turning the light flashes on the depth sensors of the camera UAV can capture relevant collision data at night.

The depth sensors can be configured to determine if there is an obstruction to the field of view of the camera. If an obstruction is detected, an adjustment signal is transmitted and received to control the flight of the plurality of UAV according to the adjustment signal.

The system can be run autonomously. The unmanned aerial vehicle photography system is configured with a predetermined flight plan. The method of unmanned aerial photography begins by controlling an aerial movement of the plurality of unmanned aerial vehicles. One way to make the system fully autonomous is to control the UAV equipped with light flashes in relation to the UAV equipped with a camera. A predetermined flight plan for the system can be created by using a planning algorithm to base the flight plan of the UAV on the flight plan of a lead UAV. Certain angles or distances can be globally defined to create the desired lighting configuration of the system. The planning algorithm can be used to make sure that no UAV are in the field of view of the camera. With the light flashes not affixed to the UAV equipped with a camera the system is better equipped to create ideal lighting conditions by having the flash at a configurable angle to enable better shadows and enhance structural details. The predetermined flight plan can be configured to take several photographs from different positions within the same predetermined flight plan.

A voxel map of the surrounding environment is created from the depth images generated by the depth sensors. Using the voxel map to detect an object's surface, including its surface normal, the one or more processors can control the transceiver to transmit or receive an adjustment signal to change the position of the UAV to properly take the photograph with the desired lighting conditions.

The UAV can be positioned in a way to reduce or eliminate overexposure. Additionally the system can detect if the flash is too bright. If the system determines that the flash brightness is not ideal it can adjust the power to the light flashes. For example, the system may transmit an adjustment signal indicating that the power of at least one of the light flashes is to be reduced. As another example, the system may review a photograph and determine that there is a reflection from the object to be photographed and adjust the position of the UAV in a way that the flash will not reflect from the surface of the object to be photographed. If the photograph is determined to be unsatisfactory, for any reason, the system may transmit a signal indicating that a position adjustment of a UVA is required or to reduce the power of a light flash.

When the camera is in position to take a photograph, the depth sensors detect the surface of the object to be photographed. If the one or more processors of determine that the position of any of the UAV in the system need to be adjusted based on the surface of the object to be photographed, an adjustment signal is transmitted to control the flight and position of the plurality of UAV according to the adjustment signal.

The one or more processors of control the camera to take a photograph, and generate or process a synchronization signal to control the light flashes to flash. The one or more processors may further control the camera's exposure time, and the type of photograph including black and white, color, burst, or video.

The one or more processors can be configured to review the photograph to ensure that it is satisfactory. For example, to ensure that there is no noise because of poor lighting.

The system can be used to create 3D models from the photographs taken of the point of interest. For the purpose of creating 3D models, the light flashes can be controlled to create conditions without shadows. For example, in flash photography there is a feature called high speed sync. This changes the behavior of the light flash. Instead of one big flash, a series of very short flashes will be fired within a small fraction of a second. This allows the exposure time to be so low, that basically all natural sun light will not be captured. Only the light from the flash will be visible in the photographs. This makes it possible to take photographs for 3D reconstruction without shadows cast from natural sun light or, if desired, with a certain directed shadow. The system can be configured to autonomously to take multiple photographs. For example if multiple photographs are required to create a 3D model.

The positions and alignments of the UAV can be manually adjusted for artistic purposes like usage in cinematography. For example, a user can modify the predetermined flight plan to achieve photographs from user desired angles. Additionally, artistic mode could include a user manually reviewing the photographs and entering an adjustment instruction to achieve a user desired lighting feature. For example, a user may manually configure the flash power or other flash properties Example 1 is an unmanned aerial vehicle, including: a support structure; a camera coupled to the support structure and configured to take a photograph; one or more processors coupled to the support structure and configured to control a predetermined flight plan of the unmanned aerial vehicle, control the camera, generate or process a synchronization signal to synchronize a light flash to be generated by a further unmanned aerial vehicle with a taking of the photograph by the camera; a transceiver coupled to the support structure and configured to transmit or receive the synchronization signal to or from the further unmanned aerial vehicle.

In Example 2, the subject matter of Example 1 can optionally include that the one or more processors are configured to generate or process an adjustment signal to ensure that the further unmanned aerial vehicle is not in the camera's field of vision; and wherein the transceiver is configured to transmit or receive the adjustment signal to or from the further unmanned aerial vehicle.

In Example 3, the subject matter of Example 2 can optionally include that the one or more processors are configured to generate the adjustment signal based on a manual adjustment of the movement of the unmanned aerial vehicle or the further unmanned aerial vehicle.

In Example 4, the subject matter of any one of Examples 1 to 3 can optionally include that the one or more processors are further configured to control the camera to take a photograph in accordance with the synchronization signal.

In Example 4, the subject matter of any one of Examples 1 to 4 can optionally include that the one or more processors are further configured to generate a 3D model based on a plurality of photographs taken by the camera.

In Example 6, the subject matter of any one of Examples 1 to 5 can optionally include that the unmanned aerial vehicle further includes one or more depth sensors coupled to the support structure; wherein the one or more depth sensors are configured to capture a surrounding environment.

In Example 7, the subject matter of Example 6 can optionally include that the one or more processors are further configured to detect one or more obstacles for the unmanned aerial vehicle from the surrounding environment captured by the one or more depth sensors.

In Example 8, the subject matter of Example 7 can optionally include that the one or more processors are further configured to control the transceiver to transmit the adjustment signal based on the one or more detected obstacles.

Example 9 is a method including: controlling a predetermined flight plan of an unmanned aerial vehicle; controlling a camera; generating or processing a synchronization signal to synchronize a light flash to be generated by a further unmanned aerial vehicle with a taking of a photograph by the camera; transmitting or receiving the synchronization signal to or from the further unmanned aerial vehicle.

In Example 10, the subject matter of Example 9 an optionally include generating or processing an adjustment signal to ensure that the further unmanned aerial vehicle is not in the camera's field of vision; and transmitting or receiving the adjustment signal to or from the further unmanned aerial vehicle.

In Example 11, the subject matter of Example 10 can optionally include generating the adjustment signal based on a manual adjustment of the movement of the unmanned aerial vehicle or the further unmanned aerial vehicle.

In Example 12, the subject matter of Examples 9 to 11 can optionally include controlling the camera to take the photograph in accordance with the synchronization signal.

In Example 13, the subject matter of Examples 9 to 12 can optionally include generating a 3D model based on a plurality of photographs taken by the camera.

In Example 14, the subject matter of Examples 9 to 13 can optionally include capturing a surrounding environment.

In Example 15, the subject matter of Example 14 can optionally include detecting one or more obstacles for the unmanned aerial vehicle from the surrounding environment.

In Example 16, the subject matter of Example 15 can optionally include controlling the transceiver to transmit the adjustment signal based on the one or more detected obstacles.

Example 17 is an unmanned aerial vehicle, including: a support structure; a flash device coupled to the support structure and configured to provide a light flash; one or more processors coupled to the support structure and configured to control a predetermined flight plan of the unmanned aerial vehicle, control the flash device, generate or process a synchronization signal to synchronize the light flash to be generated with a taking of a photograph by a camera of a further unmanned aerial vehicle transmitting the synchronization signal; a transceiver coupled to the support structure and configured to transmit or receive the synchronization signal to or from the further unmanned aerial vehicle.

In Example 18, the subject matter of Example 17 can optionally include that the one or more processors are configured to generate or process an adjustment signal to ensure that the unmanned aerial vehicle is not in the field of vision of the camera of the further unmanned aerial vehicle; and wherein the transceiver is configured to transmit or receive the adjustment signal to or from the further unmanned aerial vehicle.

In Example 19, the subject matter of Example 18 can optionally include that the one or more processors are configured to generate the adjustment signal based on a manual adjustment of the movement of the unmanned aerial vehicle or the further unmanned aerial vehicle.

In Example 20, the subject matter of Examples 17 to 19 can optionally include that the one or more processors are further configured to control the flash device to generate the light flash in accordance with the synchronization signal.

In Example 21, the subject matter of Examples 17 to 20 can optionally include that the one or more depth sensors are coupled to the support structure; wherein the one or more depth sensors are configured to capture a surrounding environment.

In Example 22, the subject matter of Example 21 can optionally include that the one or more processors are further configured to detect one or more obstacles for the unmanned aerial vehicle from the surrounding environment captured by the one or more depth sensors.

In Example 23, the subject matter of Example 22 can optionally include that the one or more processors are further configured to control the transceiver to transmit the adjustment signal based on the one or more detected obstacles.

Example 24 is a method, including: controlling a predetermined flight plan of an unmanned aerial vehicle, controlling a flash device, generating or processing a synchronization signal to synchronize a light flash to be generated with a taking of a photograph by a camera of a further unmanned aerial vehicle transmitting the synchronization signal; transmitting or receiving the synchronization signal to or from the further unmanned aerial vehicle.

In Example 25, the subject matter of Example 24 can optionally include generating or processing an adjustment signal to ensure that the further unmanned aerial vehicle is not in the field of vision of the camera of the further unmanned aerial vehicle; and transmitting or receiving the adjustment signal to or from the further unmanned aerial vehicle.

In Example 26, the subject matter of Example 25 can optionally include generating the adjustment signal based on a manual adjustment of the movement of the unmanned aerial vehicle or the further unmanned aerial vehicle.

In Example 27, the subject matter of Examples 24 to 26 can optionally include controlling the flash device to generate the light flash in accordance with the synchronization signal.

In Example 28, the subject matter of Examples 24 to 27 can optionally include capturing a surrounding environment.

In Example 29, the subject matter of Example 28 can optionally include detecting one or more obstacles for the unmanned aerial vehicle from the surrounding environment captured.

In Example 30, the subject matter of Example 29 can optionally include transmitting the adjustment signal based on the one or more detected obstacles.

Example 31 is a means for unmanned aerial flight including: a frame capable of supporting structures; a photograph capturing means, configured to take a photograph; one or more processing means, configured to: control a predetermined flight plan for unmanned aerial flight, control the photograph capturing means, generate or process a synchronization signal to synchronize a light flash with a taking of the photograph; a transceiving means configured to transmit or receive the synchronization signal.

Example 32 is a non-transitory computer readable medium configured to cause one or more processors to perform the method of: controlling a predetermined flight plan of an unmanned aerial vehicle; controlling a camera; generating or processing a synchronization signal to synchronize a light flash to be generated by a further unmanned aerial vehicle with a taking of a photograph by the camera; transmitting or receiving the synchronization signal to or from the further unmanned aerial vehicle.

Example 33 is a means for unmanned aerial flight, including: a frame capable of supporting structures; a light flashing means, configured to provide a light flash; one or more processing means, configured to: control a predetermined flight plan for unmanned aerial flight, control the light flashing means, generate or process a synchronization signal to synchronize a light flash with a taking of a photograph; a transceiving means configured to transmit or receive the synchronization signal.

Example 34 is a non-transitory computer readable medium configured to cause one or more processors to perform the method of: controlling a predetermined flight plan of an unmanned aerial vehicle, controlling a flash device, generating or processing a synchronization signal to synchronize a light flash to be generated with a taking of a photograph by a camera of a further unmanned aerial vehicle transmitting the synchronization signal; transmitting or receiving the synchronization signal to or from the further unmanned aerial vehicle.

What is claimed is:
1. An unmanned aerial vehicle, comprising:
a support structure;
a camera coupled to the support structure and configured to take one or more photographs;
one or more depth sensors coupled to the support structure configured to capture a surrounding environment;
one or more processors coupled to the support structure and configured to
control a predetermined flight plan of the unmanned aerial vehicle,
control the camera, generate a voxel map based on the captured surrounding environment, detect one or more obstacles in the voxel map of the surrounding environment, generate or process an adjustment signal to modify a position or flight plan of a further unmanned aerial vehicle based on the one or more detected obstacles, generate or process a synchronization signal to synchronize a light flash to be generated by the further unmanned aerial vehicle with a taking of the photograph by the camera;

a transceiver coupled to the support structure and configured to transmit or receive the synchronization signal or adjustment signal to or from the further unmanned aerial vehicle.

2. The unmanned aerial vehicle of claim 1, wherein the one or more processors are configured to generate or process the adjustment signal to ensure that the further unmanned aerial vehicle is not in the camera's field of vision; and wherein the transceiver is configured to transmit or receive the adjustment signal to or from the further unmanned aerial vehicle.

3. The unmanned aerial vehicle of claim 2, wherein the one or more processors are configured to generate the adjustment signal based on a manual adjustment of the movement of the unmanned aerial vehicle or the further unmanned aerial vehicle.

4. The unmanned aerial vehicle of claim 1, wherein the one or more processors are further configured to control the camera to take a photograph in accordance with the synchronization signal.

5. The unmanned aerial vehicle of claim 1 wherein the one or more depth sensors may be depth cameras.

6. A method comprising:

controlling a predetermined flight plan of an unmanned aerial vehicle;

controlling a camera;

generating a voxel map based on one or more photographs, detecting one or more obstacles in a surrounding environment of the unmanned aerial vehicle, generating or processing an adjustment signal to modify a position or flight plan of a further unmanned aerial vehicle based on the one or more detected obstacles, generating or processing a synchronization signal to synchronize a light flash to be generated by the further unmanned aerial vehicle with a taking of a photograph by the camera;

transmitting or receiving the synchronization signal or adjustment signal to or from the further unmanned aerial vehicle.

7. The method of claim 6, further comprising:

generating or processing the adjustment signal to ensure that the further unmanned aerial vehicle is not in the camera's field of vision; and transmitting or receiving the adjustment signal to or from the further unmanned aerial vehicle.

8. The method of claim 7, further comprising:

generating the adjustment signal based on a manual adjustment of the movement of the unmanned aerial vehicle or the further unmanned aerial vehicle.

9. The method of claim 6, further comprising:

controlling the camera to take the photograph in accordance with the synchronization signal.

10. An unmanned aerial vehicle, comprising:

a support structure;

a flash device coupled to the support structure and configured to provide a light flash;

one or more processors coupled to the support structure and configured to control a predetermined flight plan of the unmanned aerial vehicle, control the flash device, generate or process a synchronization signal to synchronize the light flash to be generated with a taking of a photograph by a camera of a further unmanned aerial vehicle transmitting the synchronization signal;

a transceiver coupled to the support structure and configured to transmit or receive the synchronization signal to or from the further unmanned aerial vehicle, wherein the transceiver is further configured to receive an adjustment signal to modify a position or flight plan of the unmanned aerial vehicle based on one or more detected obstacles of a voxel map of a surrounding environment of a further unmanned aerial vehicle.

11. The unmanned aerial vehicle of claim 10, wherein the one or more processors are configured to generate or process the adjustment signal to ensure that the unmanned aerial vehicle is not in the field of vision of the camera of the further unmanned aerial vehicle; and wherein the transceiver is configured to transmit or receive the adjustment signal to or from the further unmanned aerial vehicle.

12. The unmanned aerial vehicle of claim 11, wherein the one or more processors are configured to generate the adjustment signal based on a manual adjustment of the movement of the unmanned aerial vehicle or the further unmanned aerial vehicle.

13. The unmanned aerial vehicle of claim 10, wherein the one or more processors are further configured to control the flash device to generate the light flash in accordance with the synchronization signal.

14. The unmanned aerial vehicle of claim 10, further comprising:

one or more depth sensors coupled to the support structure.

15. The unmanned aerial vehicle of claim 1, wherein the one or more obstacles are detected by ray-tracing.

16. The unmanned aerial vehicle of claim 1, wherein the one or more obstacles are detected by ray-casting.

17. The unmanned aerial vehicle of claim 1, wherein the one or more obstacles are detected by rasterization.

* * * * *